US007852339B2

(12) United States Patent
Buxton

(10) Patent No.: US 7,852,339 B2
(45) Date of Patent: Dec. 14, 2010

(54) VIDEO COMPOSITION OPTIMIZATION BY THE IDENTIFICATION OF TRANSPARENT AND OPAQUE REGIONS

(75) Inventor: Mark J. Buxton, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 1087 days.

(21) Appl. No.: 11/584,903

(22) Filed: Oct. 23, 2006

(65) Prior Publication Data

US 2008/0106530 A1 May 8, 2008

(51) Int. Cl.
*G06F 15/00* (2006.01)
*G09G 5/02* (2006.01)
*G09G 5/00* (2006.01)

(52) U.S. Cl. ........................ 345/501; 345/592; 345/629

(58) Field of Classification Search ................. 345/501, 345/592, 629

See application file for complete search history.

(56) References Cited

U.S. PATENT DOCUMENTS

| | | | | |
|---|---|---|---|---|
| 5,388,192 | A * | 2/1995 | Ohsawa et al. | 345/634 |
| 5,471,248 | A * | 11/1995 | Bhargava et al. | 375/240.24 |
| 6,005,584 | A * | 12/1999 | Kitamura et al. | 345/582 |
| 6,657,677 | B1 * | 12/2003 | He et al. | 348/625 |
| 6,666,535 | B2 * | 12/2003 | Xie et al. | 347/5 |
| 7,062,087 | B1 * | 6/2006 | Varga | 382/166 |
| 2005/0168649 | A1 * | 8/2005 | Johnson | 348/663 |
| 2006/0153532 | A1 * | 7/2006 | McCrossan et al. | 386/95 |

* cited by examiner

*Primary Examiner*—Xiao M Wu
*Assistant Examiner*—David T Welch
(74) *Attorney, Agent, or Firm*—Buckley, Maschoff & Talwalkar LLC

(57) ABSTRACT

According to some embodiments a method is provided to scan a first row of a display plane, determine that the first row of the display plane includes a non-transparent pixel, indicate the first row has a non-transparent pixel; and composite the first row of the display plane.

16 Claims, 7 Drawing Sheets

VIDEO COMPOSITION OPTIMIZATION BY THE IDENTIFICATION OF TRANSPARENT AND OPAQUE REGIONS

BACKGROUND

A digital video disk ("DVD") may have several variants such as a high-definition digital video disk ("HD-DVD") and a Blue Ray digital video disk (BR-DVD). A DVD, HD-DVD, or BR-DVD image may be composed of several display planes. One or more of these display planes may be overlaid on over another display plane to compose a multi-plane image.

Multi-plane images are becoming more complex by having higher resolution graphics and more layers of display planes. Accordingly, the computer systems that display these images may experience a degradation in performance. For example, a mobile platform displaying these types of images from a DVD may consume an impractical amount of power.

DETAILED DESCRIPTION

The several embodiments described herein are provided solely for the purpose of illustration. Embodiments may include any currently or hereafter-known versions of the elements described herein. Therefore, persons in the art will recognize from this description that other embodiments may be practiced with various modifications and alterations.

Figure 1:
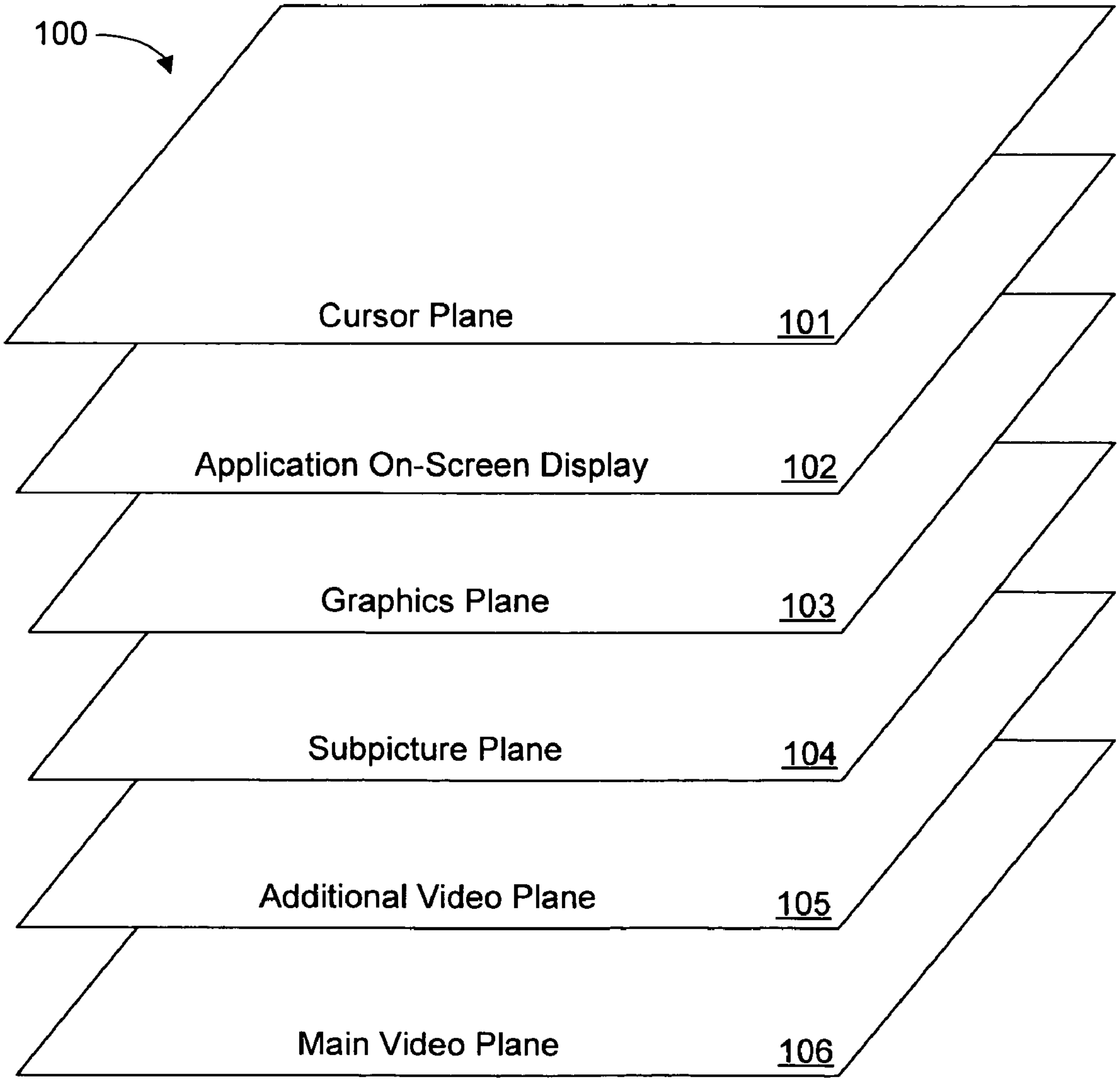
FIG. 1 illustrates a block diagram of display planes.

Referring now to FIG. 1, an embodiment of a multi-plane image 100 is shown. In some embodiments, the multi-plane image 100 may be a HD-DVD image, a BR-DVD image or a DVD image. A storage device such as a DVD player or a media player may display the multi-plane image 100. The multi-plane image 100 may comprise one or more display planes 101-106. Display planes may be, but are not limited to, a cursor plane 101, an application on-screen display 102, a graphics plane 103, a subpicture plane 104, an additional video plane 105, and a main video plane 106. While six display planes 101-106 are displayed in FIG. 1, any number of display planes 101-106 may comprise a multi-plane image 100 and the multi-plane image 100 may contain display planes 101-106 in a different order.

In some embodiments, the main video plane 106 may provide an image, the graphics plane 103 may display graphical objects or primitives over the main video plane 106 image, and the subpicture plane 104 may provide text or subtitles over the main video plane 106 image.

In some embodiments, the subpicture plane 104 may comprise a plurality of pixels. A first portion of the plurality of pixels may be opaque or non-transparent pixels and a second portion of the plurality of pixels may be transparent pixels. In conventional methods, every pixel of the subpicture plane 104 may be displayed when composing the multi-planed image whether the pixel is transparent or non-transparent. The conventional methods may be inefficient since system memory and processor resources are required to display, process and compose transparent pixels. Displaying only the opaque or non-transparent pixels may be more efficient than conventional methods.

Figure 2:
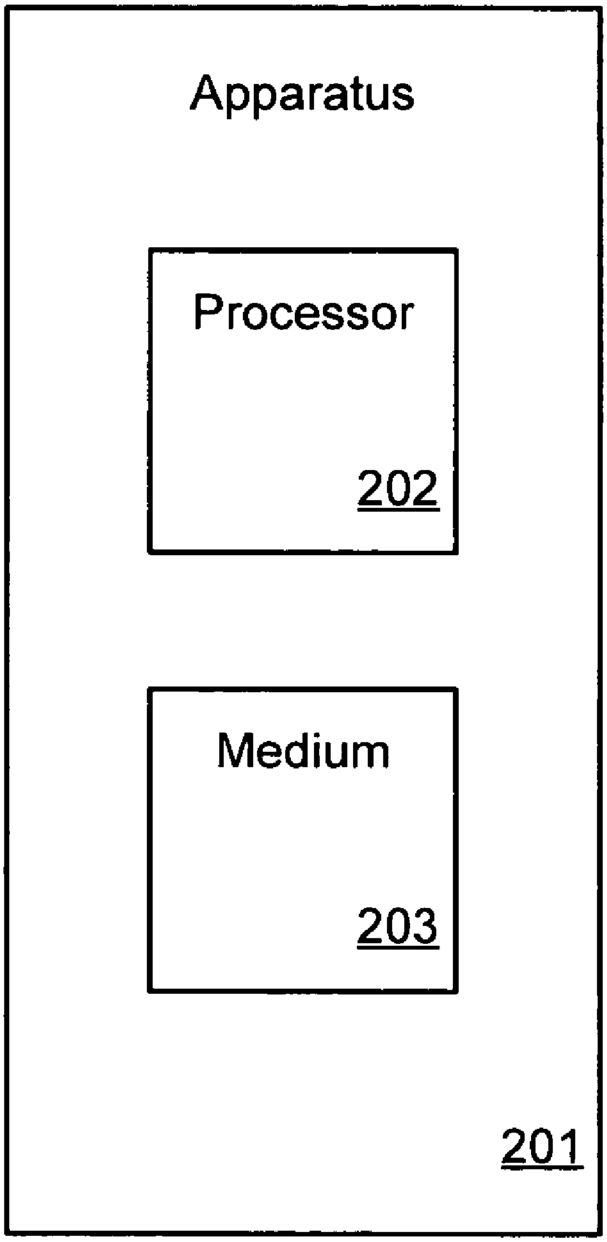
FIG. 2 illustrates a block diagram of an apparatus according to some embodiments.

Now referring to FIG. 2, an embodiment of an apparatus 201 is shown. The apparatus 201 may comprise a processor 202 and a medium 203. The medium 203 may comprise any magnetic media, read only memory, random access memory, flash memory, non-volatile memory, or any other available medium that may store instructions adapted to be executed by the processor 202.

The apparatus 201 may comprise any electronic system, including, but not limited to, a desktop computer, a server, a graphics card, and a laptop computer. Moreover, the processor 202 may comprise any integrated circuit that is or becomes known.

For purposes of the present description, the processor 202 may comprise a system for executing program code. The program code may comprise one or more threads of one or more software applications. The processor 202 may include or otherwise be associated with dedicated registers, stacks, queues, etc. that are used to execute program code and/or one or more of these elements may be shared there between.

Figure 3:
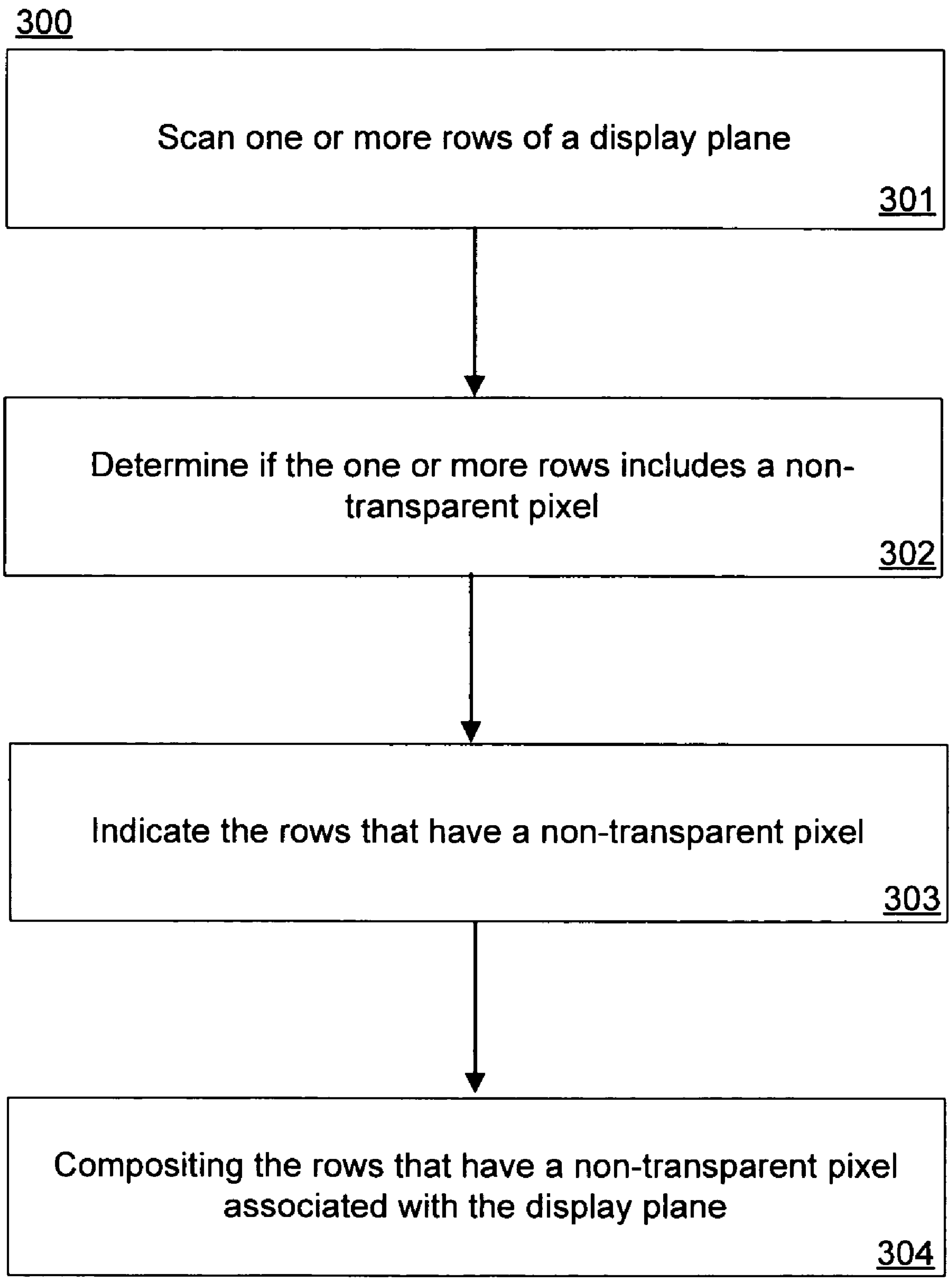
FIG. 3 comprises a flow diagram of a process according to some embodiments.

Now referring to FIG. 3, an embodiment of a process 300 is shown. Process 300 may be executed by any combination of hardware, software, and firmware, including but not limited to, the apparatus 200 of FIG. 2. Some embodiments of process 300 may reduce video composition memory usage and power consumption.

At 301, one or more rows of a display plane may be scanned. Each display plane may comprise a plurality of rows. In some embodiments, a scanning mechanism, such as but not limited to, a software subpicture decoder or a graphics drawing component, may analyze each row of the scanned one or more rows, and at 302, may determine that a row of the one or more rows includes a non-transparent pixel.

Next, at 303 the one or more rows having a non-transparent pixel may each be indicated as including a non-transparent pixel. In some embodiments, each row of the display plane may be associated with a control bit and if a row of the display plane has a non-transparent bit then a control bit associated with the row containing the non-transparent pixel may be set.

In some embodiments, when two ore more rows contain non-transparent pixels, the successively set control bits of the two ore more rows may be grouped into a bounding rectangle. In some embodiments, when two or more rows contain non-transparent pixels a rightmost upper bit and a leftmost lower bit may be marked to indicate the rows of a display plane that have non-transparent pixels.

Next at 304, the one or more rows that have a non-transparent bit and are associated with the display plane are composited. In some embodiments, a compositor may compose the one or more rows containing a non-transparent bit and display the rows. In some embodiments, the one or more rows containing a non-transparent bit are display with other display planes. In some embodiments, the compositor may be hardware, software or firmware. Because transparent pixels are not composited, less memory and processor resources may be used.

Figure 4:
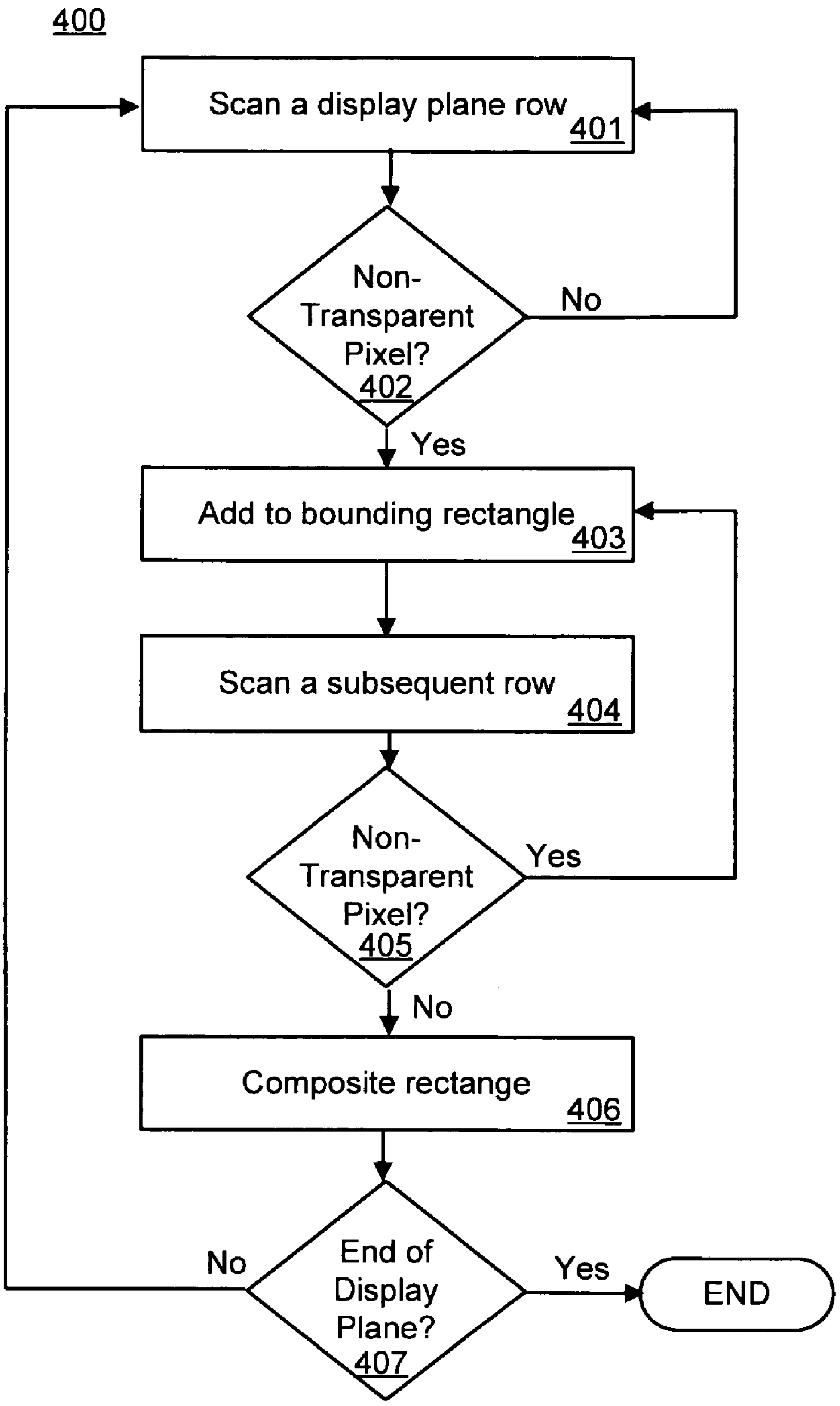
FIG. 4 comprises a flow diagram of a process according to some embodiments.

Referring now to FIG. 4, an embodiment of a process 400 is shown. Process 400 may be executed by any combination of hardware, software, and firmware, including but not limited to, the apparatus 200 of FIG. 2. Some embodiments of process 400 may reduce video composition memory usage and power consumption.

At 401, a row of a display plane may be scanned. Each display plane may comprise one or more rows of pixels. In some embodiments, the display plane may be a subpicture plane or a graphics plane.

Next, at 402, if the scanned row of 401 does not contain a non-transparent pixel then another row of a display plane may be scanned. However, if the scanned row of 401 contains a non-transparent pixel then that row may be added to a bounding rectangle at 403. If the bounding rectangle already exists, the scanned row may be added to the existing bounding rectangle. However, if no rectangle exists then a new bounding rectangle may be started or created and the scanned row may be added to the new bounding rectangle.

Once a row containing a non-transparent pixel is discovered, a subsequent row may be scanned at 404. If the subsequent row contains a non-transparent pixel then a second subsequent row of the display plane may be scanned. If the second subsequent row of the display plane is determined at 405 to contain a non-transparent pixel, then the second subsequent row may be added to the bounding rectangle. This process may continue until at 405 a row of the display plane does not contain a non-transparent pixel. If at 405, a row of the display plane may be fully transparent (i.e. does not contain a non-transparent pixel) then the bounding rectangle may be composited at 406.

Accordingly, at 407 if an end of the display plane has been reached the process may be stopped. Otherwise, a next row may be scanned at 401.

Figure 5:
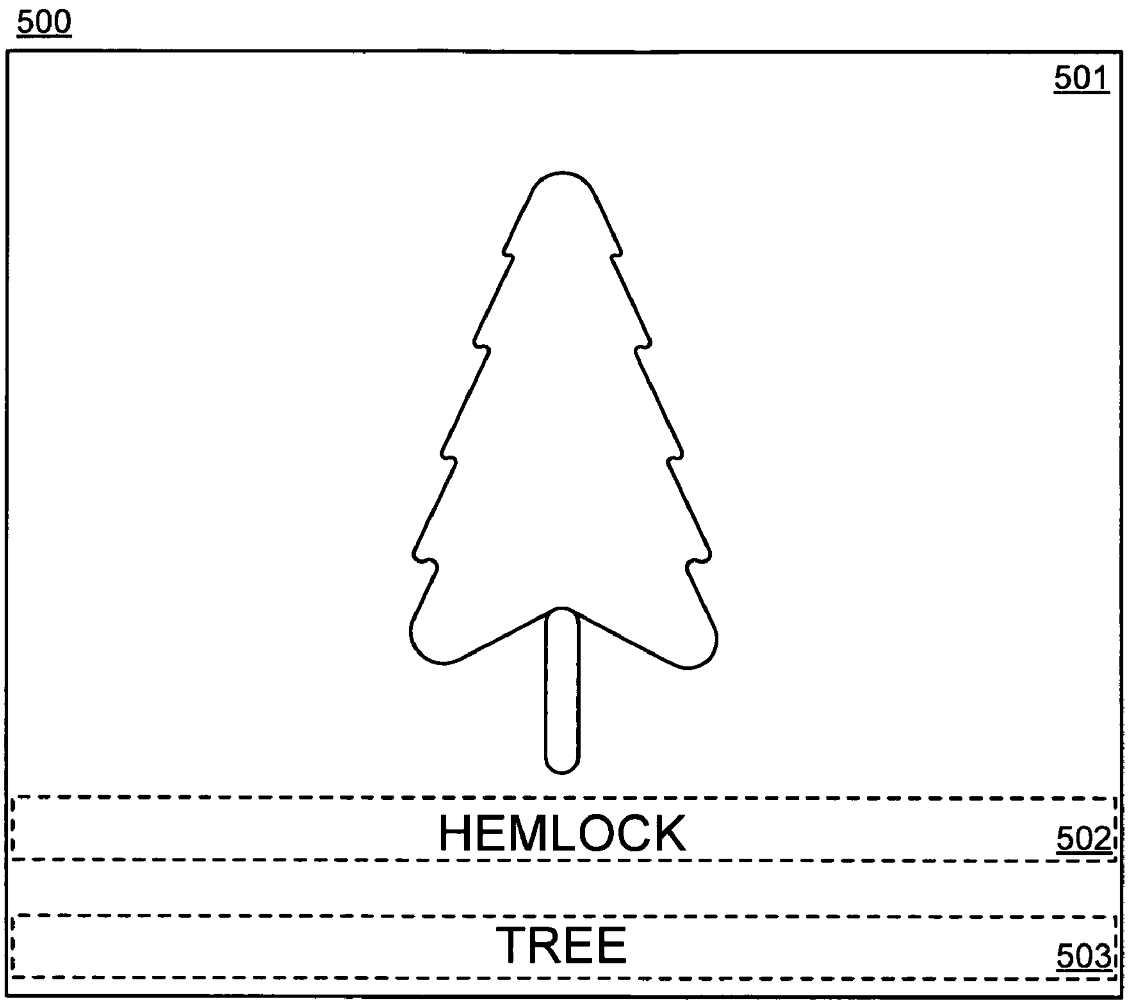
FIG. 5 illustrates a block diagram of an image according to some embodiments.
Figure 6:
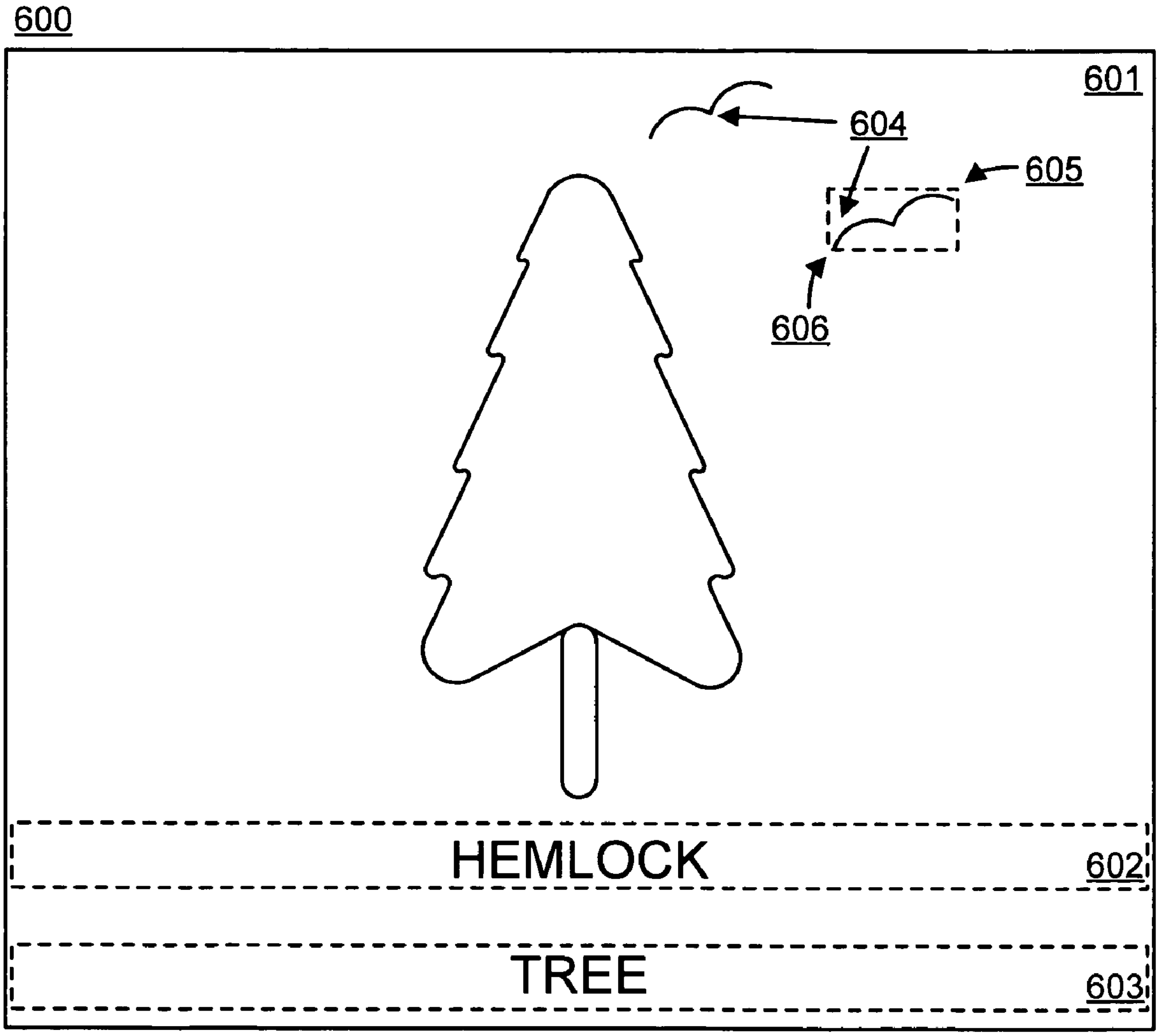
FIG. 6 illustrates a block diagram of an image according to some embodiments.

Now referring to FIG. 5, an embodiment of a multi-plane image 500 is shown. In one embodiment, multi-plane image 500 may comprise a main video plane 501 comprising an image. For example, as shown in FIG. 5, the image may be a tree. A subpicture plane, such as that described in FIG. 1, may overlay the main video plane 501 and may contain subtitles. A first subtitle may contain one or more words, letter, numbers or symbols that comprise one or more rows of the subpicture plane that contain non-transparent pixels. Each row associated with the first subtitle and subsequent rows associated with the same subtitle may be associated with a first bounding rectangle 502. Likewise, each row associated with the second subtitle may be associated with a second bounding rectangle 503. In some embodiments, each bounding rectangle 502-503 may be defined by setting a control bit associated with each row containing a non-transparent pixel Now referring to FIG. 6, an embodiment of a multi-plane image 600 is shown. In one embodiment, multi-plane image 600 may comprise a main video plane 601 comprising an image such as that described in respect with FIG. 5, a subpicture plane, such as that described in FIG. 5, and a graphics plane including one or more graphic objects or primitives 604. Each graphic object may be associated with a bounding rectangle 602, 603. The bounding rectangle for the graphic object may be defined by a leftmost lower pixel 606 and a rightmost upper pixel 605. Conversely, the graphic object may be defined by a leftmost upper pixel and a rightmost lower pixel.

Figure 7:
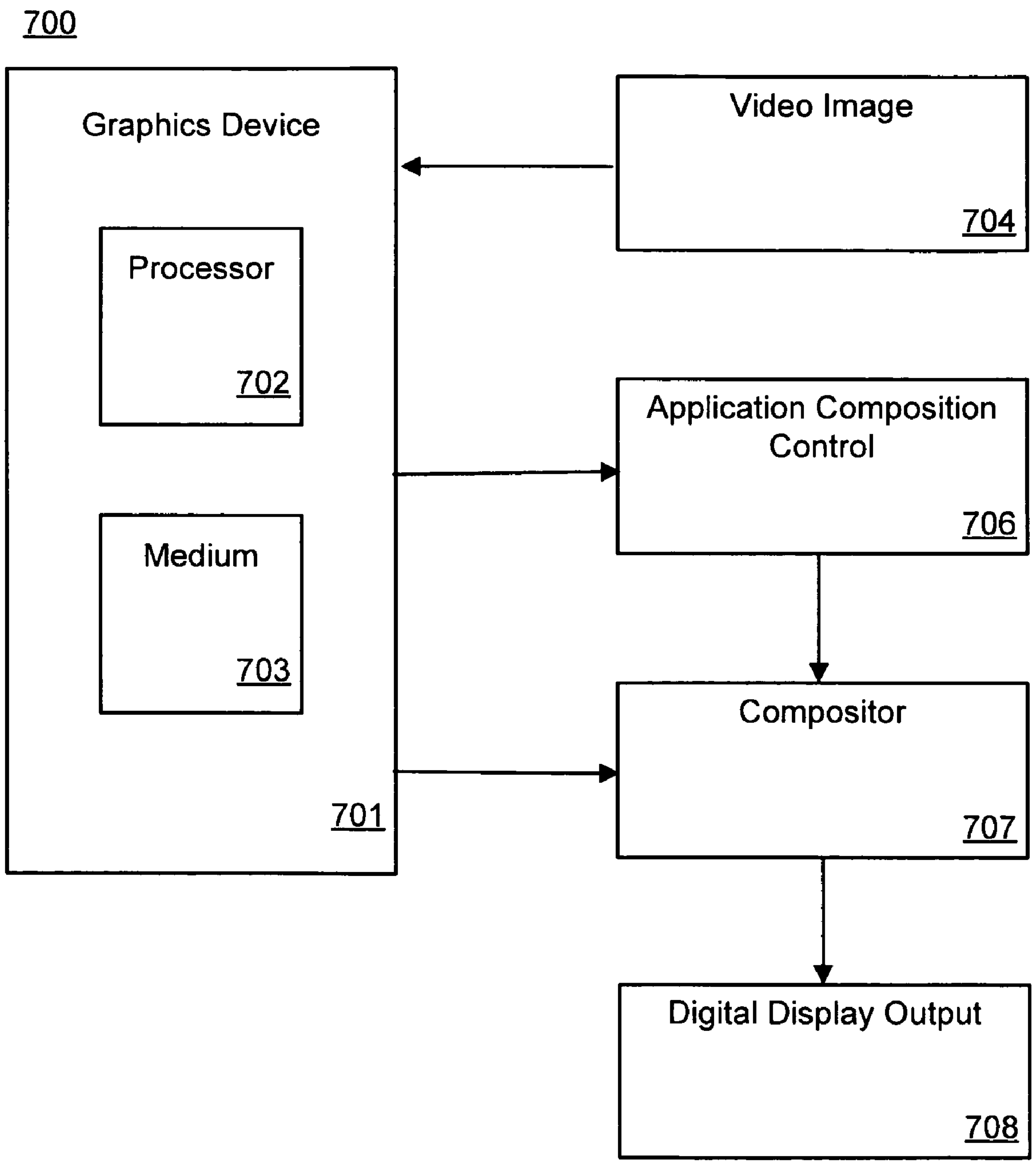
FIG. 7 illustrates a block diagram of a system according to some embodiments.

Now referring to FIG. 7, an embodiment of a system 700 is shown. FIG. 5 may implement process 300 or process 400 according to some embodiments. The system 700 may comprise a graphics device 701, a video image 704, an application composition control 706, a compositor 707, and a digital display output 708.

The graphics device 701 may comprise a processor 702 and a medium 703. In some embodiments, the graphics device may be a software subpicture decoder. In some embodiments, the graphics device may be a graphics drawing component. The graphics device 701 may identify regions of a display plane that contain non-transparent pixels and communicate bounding information regarding these regions to the application composition control 706. The information sent to the application composition control 506 may comprise bounding information such as, but not limited to, bounding rectangles used to reduce the number of pixels composited. In some embodiments, the information may be transmitted in messages that may be synchronized to the subpicture decoder output.

The medium 703 may comprise any magnetic media, read only memory, random access memory, flash memory, non-volatile memory, or any other available medium that may store instructions adapted to be executed by the processor 702 to perform a method.

The video image 704 may comprise a bit stream. In some embodiments, the bit stream may be a subpicture bit stream from a subpicture plane. In some embodiments, the bit stream may comprise graphics language and control information.

The application composition control 706 may receive input from the graphics device 701. The application composition control 706 may take the input and determines a number of bounding rectangles to send to the compositor 707. In some embodiments, clear rectangle may be used by the application compositor control to send smaller rectangles to the hardware compositor for each plane. In some embodiments, fully opaque window may be used by the application composition control to block the composition of rectangles. The application composition control may handle a larger number of smaller rectangles than the conventional systems that use larger rectangles.

The compositor 707 may composite or combine one or more display planes into a single video image. In some embodiments the compositor may be implemented in hardware. In some embodiments, the compositor may be implemented in software or firmware.

The digital display output 708 may receive a composite video image from the compositor and provide the composite video image to a display system or display screen.

The foregoing disclosure has been described with reference to specific exemplary embodiments thereof. It will, however, be evident that various modifications and changes may be made thereto without departing from the broader spirit and scope set forth in the appended claims.

What is claimed is:

1. A method comprising:

scanning a first row of a display plane, the first display plane being part of a multi-plane display;

determining, by a processor, that the first row of the display plane includes a non-transparent pixel;

indicating the first row has a non-transparent pixel by adding the entire first row to a first bounding rectangle;

scanning a second row of the display plane, wherein the second row is subsequent and adjacent to the first row;

determining that the second row includes a non-transparent pixel;

adding the entire second row to the first bounding rectangle;

scanning a third row of the display plane, wherein the third row is subsequent to the second row;

determining that the third row does not include a non-transparent pixel;

arranging for the third row to not be added to any bounding rectangle;

scanning a fourth row of the display plane, wherein the fourth row is subsequent to the third row;

determining that the fourth row includes a non-transparent pixel;

adding the entire fourth row to a second bounding rectangle; and compositing, by the processor, rows of the of the display plane within the first and second bounding rectangles with corresponding rows in another plane, wherein rows not within the first and second bounding rectangles are not composited with corresponding rows in the other plane.

2. The method of claim 1, wherein the first row of the display plane is added to the first bounding rectangle by setting a control bit indicating the first row of the display plane includes a non-transparent pixel.

3. The method of claim 1, wherein the display plane is a subpicture plane.

4. The method of claim 1, wherein the display plane is a graphics plane.

5. The method of claim 1, further comprising:

scanning an additional row of the display plane, wherein the additional row of the display plane is a subsequent row to the first row;

determining that the additional row of the display plane includes a non-transparent pixel; and indicating the additional row has a non-transparent pixel, wherein the indicating comprises:

marking an uppermost right pixel; and marking a lowermost left pixel.

6. The method of claim 5, wherein the display plane is a graphics plane.

7. The method of claim 5, wherein the display plane is a subpicture plane.

8. The method of claim 1, further comprising:

scanning an additional row of the display plane, wherein the additional row of the display plane is a subsequent row to the first row;

determining that the additional row of the display plane includes a non-transparent pixel; and indicating the additional row has a non-transparent pixel, wherein the indicating comprises:

marking an uppermost left pixel; and marking a lowermost right pixel.

9. An apparatus comprising:

a storage device to store information associated with a video image comprising a plurality of display planes, wherein each display plane comprises a plurality of rows;

a processor; and a medium storing instructions adapted to be executed by the processor to perform a method, the method comprising:

scanning a first row of a display plane, the first display plane being part of a multi-plane display;

determining that the first row of the display plane includes a non-transparent pixel;

indicating the first row has a non-transparent pixel by adding the entire first row to a first bounding rectangle;

scanning a second row of the display plane, wherein the second row is subsequent and adjacent to the first row;

determining that the second row includes a non-transparent pixel;

adding the entire second row to the first bounding rectangle;

scanning a third row of the display plane, wherein the third row is subsequent to the second row;

determining that the third row does not include a non-transparent pixel;

arranging for the third row to not be added to any bounding rectangle;

scanning a fourth row of the display plane, wherein the fourth row is subsequent to the third row;

determining that the fourth row includes a non-transparent pixel;

adding the entire fourth row to a second bounding rectangle; and compositing rows of the of the display plane within the first and second bounding rectangles with corresponding rows in another plane, wherein rows not within the first and second bounding rectangles are not composited with corresponding rows in the other plane.

10. The apparatus of claim 9, wherein the display plane is a subpicture plane.

11. The apparatus of claim 9, wherein the display plane is a graphics plane.

12. The apparatus of claim 9, further comprising instructions to:

scan an additional row of the display plane, wherein the additional row of the display plane is a subsequent row to the first row;

determine that the additional row of the display plane includes a non-transparent pixel; and indicate the additional row has a non-transparent pixel, wherein the indicating comprises:

marking an uppermost right pixel; and marking a lowermost left pixel.

13. The apparatus of claim 12, wherein the display plane is a graphics plane.

14. The apparatus of claim 12, wherein the display plane is a subpicture plane.

15. The apparatus of claim 9, further comprising instruction to:

scan an additional row of the display plane, wherein the additional row of the display plane is a subsequent row to the first row;

determine that the additional row of the display plane includes a non-transparent pixel; and indicate the additional row has a non-transparent pixel, wherein the indicating comprises:

marking an uppermost left pixel; and marking a lowermost right pixel.

16. A system comprising:

a digital display output;

a media player to store information associated with a video image comprising a plurality of display planes, wherein each display plane comprises a plurality of rows;

a processor; and a medium storing instructions adapted to be executed by the processor to perform a method, the method comprising:

scanning a first row of a display plane, the first display plane being part of a multi-plane display;

determining that the first row of the display plane includes a non-transparent pixel;

indicating the first row has a non-transparent pixel by adding the entire first row to a first bounding rectangle;

scanning a second row of the display plane, wherein the second row is subsequent and adjacent to the first row;

determining that the second row includes a non-transparent pixel;

adding the entire second row to the first bounding rectangle;

scanning a third row of the display plane, wherein the third row is subsequent to the second row;

determining that the third row does not include a non-transparent pixel;

arranging for the third row to not be added to any bounding rectangle;

scanning a fourth row of the display plane, wherein the fourth row is subsequent to the third row;

determining that the fourth row includes a non-transparent pixel;

adding the entire fourth row to a second bounding rectangle; and compositing rows of the of the display plane within the first and second bounding rectangles with corresponding rows in another plane, wherein rows not within the first and second bounding rectangles are not composited with corresponding rows in the other plane.

* * * * *